(No Model.)
E. R. HYDE.
EMERY WHEEL AND HANGINGS THEREFOR.
No. 350,593. Patented Oct. 12, 1886.
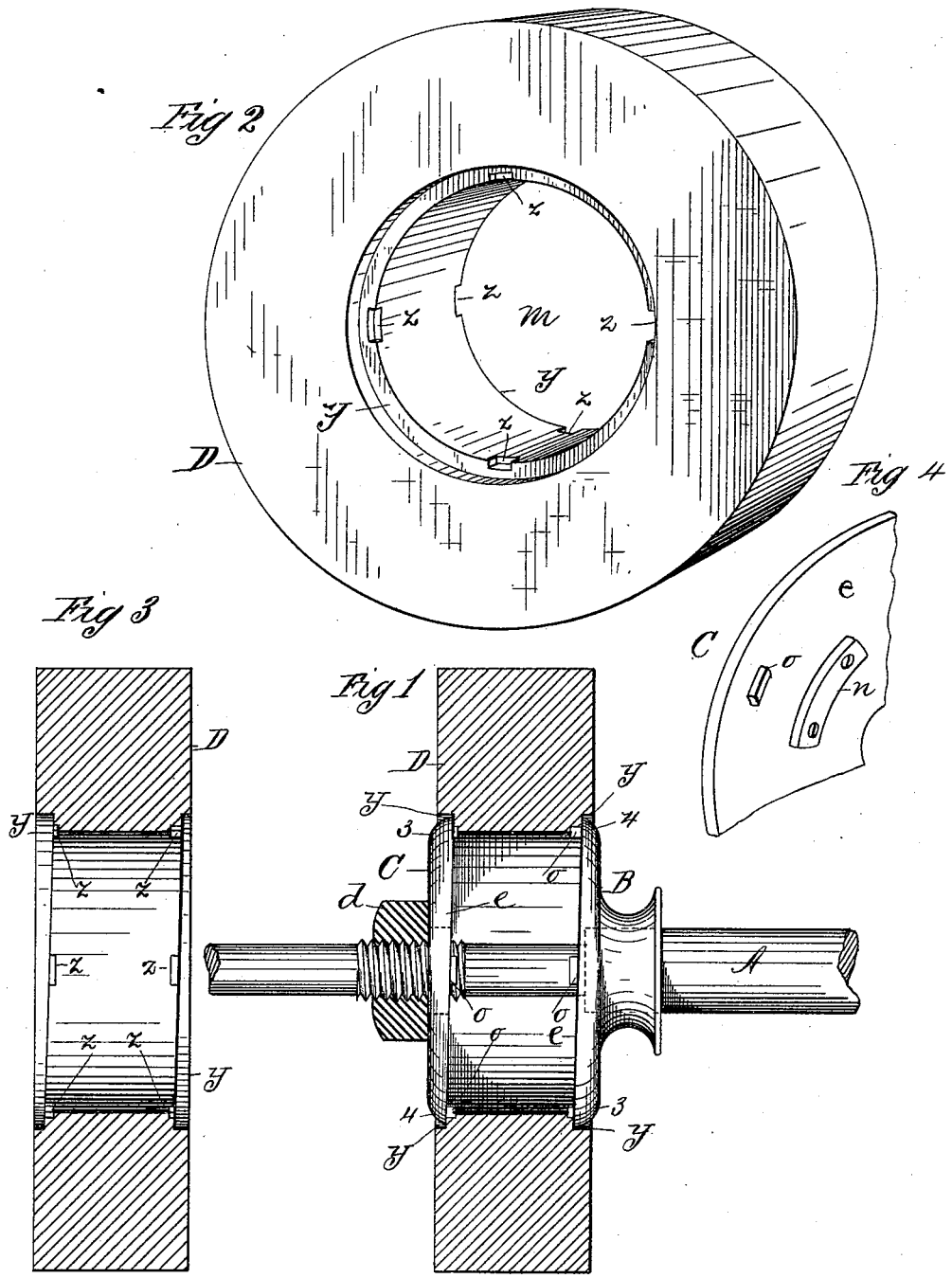
WITNESSES:
INVENTOR
Edwin R Hyde
BY
Harry A Chapin
ATTORNEY

UNITED STATES PATENT OFFICE.

ELWIN R. HYDE, OF SPRINGFIELD, MASSACHUSETTS, ASSIGNOR TO THE SPRINGFIELD GLUE AND EMERY WHEEL COMPANY, OF SAME PLACE.

EMERY-WHEEL AND HANGINGS THEREFOR.

SPECIFICATION forming part of Letters Patent No. 350,593, dated October 12, 1886.

Application filed January 2, 1886. Serial No. 187,354. (No model.)

*To all whom it may concern:*

Be it known that I, ELWIN R. HYDE, a citizen of the United States, residing at Springfield, in the county of Hampden and State of Massachusetts, have invented new and useful Improvements in Emery-Wheels and Hangings Therefor, of which the following is a specification.

This invention relates to improvements in emery-wheels and hangings therefor, the object being to provide improved clamping-flanges for emery-wheel shafts, whereby a uniform position of wheels on the latter is assured, and provision is made for properly balancing said wheels, and to provide a peculiarly-constructed wheel adapted for use with said flanges.

In the drawings forming a part of this specification, Figure 1 is a side elevation of an emery-wheel shaft (the ends being broken off) provided with clamping-flanges embodying my improvements and showing a section of an emery-wheel in operative relation to said flanges and shaft, the flange-nut on the latter being shown in section. Fig. 2 is a perspective view of an emery-wheel embodying said improvements, whereby it is adapted to be used in conjunction with said flanges and shaft. Fig. 3 is a transverse section of the emery-wheel. Fig. 4 is a perspective view of a segment of one of said flanges.

In the drawings, A is the emery-wheel shaft, and is adapted to be hung in any suitable bearings and to be rotated by the usual means.

B is a flange fixed on shaft A, and C is a movable flange on said shaft, against which a nut, $d$, thereon is screwed to force flange C against the emery-wheel D, thereby clamping the latter between said two flanges and securing it to the shaft. The planes of inner faces, $e$, of the flanges C B, when in position on each side of a wheel are parallel to each other; but that of each one is at an incline to the axis of shaft A, as shown in Fig. 1, the parts or edges 3 of each flange being made thicker than their opposite edges, 4, and each flange having fixed on its inner opposite face a series of projecting dogs, $o$, of unequal length and degree of projection from the faces of said flanges. The form of the emery-wheel D permits of attaching one or more balance-weights $n$, Fig. 4, to the inner side of one of said flanges, whereby the emery-wheel is balanced and its running improved. Said weight $n$, being on the inner side of the flange, is protected from being knocked off by use.

The emery-wheel D is made with the large circular central opening $m$, instead of the usual restricted shaft-passage through it, and in the borders of said opening $m$ in the wheel are made the rabbet-formed grooves $y$, which have a greater depth below the side of the wheel at one side than the other; or, in other words, the plane of the base of each groove is inclined to the plane of the side of the wheel to the same degree that the planes of the inner faces of the flanges C D are inclined to the axis of shaft A, said inclination of the bases of said groove $y$ being clearly shown in Figs. 2 and 3, and at the said bases of grooves $y$ are formed in the wheel the sockets $z$ to receive the said projections $o$ on the flanges C D.

In placing wheel D on shaft A, and there securing it in running position, it is necessary to turn it to such a position as to bring the deepest part of groove $y$ opposite the thickest part of the flange B, for on that part of the latter are projections $o$, which fit only into sockets $z$ of like form in said deepest part of the groove $y$, and then the flange C is placed on the shaft and against the side of the wheel, its thickest part within the deepest part of groove $y$, and the projections $o$ thereon entering the sockets $z$ in the wheel, and the nut $d$ is then put onto the shaft and screwed against flange C, securing the wheel tightly between both flanges, and so locking it that it must revolve with the shaft.

The above-described construction of flanges, and the wheel to receive the latter in grooves and sockets therein, compels the placement of each wheel on the shaft in a uniform position, and the interlocking of the said projections on the flanges with said sockets in the wheel effectually secures a coinciding rotation of shaft and wheel at all times, and obviates the necessity of clamping the wheel as tightly between the flanges as heretofore in order to give the latter sufficient frictional contact with the wheel to insure its revolution with the shaft; and, furthermore, by means of said wheel and flange construction, a chamber is formed between said flanges to permit of attaching balancing-weights as aforesaid to the flanges.

The construction of the emery-wheel with the large central opening, m, effects a considerable saving in the cost of the wheel, for where the latter is worn nearly to the borders of the flanges little remains which can be further utilized for grinding.

What I claim as my invention is—

1. An emery-wheel shaft having a flange fixed thereon whose inner face is inclined to the axis of said shaft, and has projections thereon to enter corresponding sockets in the emery-wheel, and a loose flange having a like face form and projections thereon to said first-named flange, combined with an emery-wheel, substantially as described, having a groove on each side thereof to receive the borders of said flanges, and sockets at the bases of said grooves to receive said projections on the flanges, and means, substantially as described, for securing said loose flange against the side of said wheel, substantially as set forth.

2. An emery-wheel shaft having a flange fixed thereon whose inner face is inclined to the axis of said shaft, and has projections thereon of unequal length and degree of projection to enter corresponding sockets in the emery-wheel, and a loose flange having a like face form and projections thereon to said first-named flange, combined with an emery-wheel, substantially as described, having a groove on each side thereof to receive the borders of said flanges, and sockets at the bases of said grooves to receive said projections on the flanges, and means, substantially as described, for securing said loose flange against the side of said wheel, substantially as set forth.

3. An emery-wheel having a central opening, m, in the borders of which, on each side of the wheel, are formed grooves to receive clamp flanges, the bases of said grooves being in planes inclined to the sides of the wheel, substantially as set forth.

ELWIN R. HYDE.

Witnesses:
H. A. CHAPIN,
W. F. RICE.